UNITED STATES PATENT OFFICE.

CHARLES F. A. SIMONIN, OF PHILADELPHIA, PENNSYLVANIA, AND EDWARD W. COFFIN, OF GLENDALE, NEW JERSEY, ASSIGNORS, BY MESNE ASSIGNMENTS, TO WILLIAM ADAMSON, OF PHILADELPHIA, PENNSYLVANIA.

IMPROVEMENT IN PROCESSES OF EXTRACTING FATTY SUBSTANCES.

Specification forming part of Letters Patent No. 102,166, dated April 19, 1870; reissue No. 4,067, dated July 12, 1870; reissue No. 4,508, dated August 8, 1871.

*To all whom it may concern:*

Be it known that we, CHARLES F. A. SIMONIN, of the city of Philadelphia, State of Pennsylvania, and EDWARD W. COFFIN, of Glendale, county of Camden, State of New Jersey, have invented a new and Improved Process of Extracting Fatty Substances, of which the following is a specification:

This invention has reference to the removal of oil or grease from wool, hair, hides, fur, feathers, and similar substances, preparatory to spinning, dyeing, or other manufacture; to the removal of oil or grease from all kinds of stuffs or fabrics; to the cleaning of cotton or woolen waste; to the preparation of anatomical specimens; and to the extraction, generally, of fatty or oily matters.

We take any of the lighter hydrocarbons produced by the distillation of petroleum or coal, such as napththa, benzine, benzole, or gasoline, and apply the vapor thereof to the substance from which the oil or grease is to be extracted. For this purpose the hydrocarbon is heated and the vapor passed upward through the said substances, which may be laid on racks or on a grating. That part of the oil or vapor which has taken up the oil or fat becomes condensed and falls into a receiver as a liquid hydrocarbon, holding the oil or fat in solution. This liquid is then redistilled. leaving the oil or fat in the bottom of the still, The hydrocarbon thus separated from the grease is passed into a condenser, after which it is ready to be used again; or it may be used again without previously condensing it. That portion of the vapor which has passed through the substance under treatment without taking up any oil or grease, and which has consequently not been condensed, may be either condensed or immediately used again.

By means of this process the natural oil or fat of wool, hair, &c., is saved, and may be purified and used for mercantile purposes. This proces is also more effective than that of washing the substance to be cleaned in the liquid hydrocarbon, as the vapor permeates all the wool, hair, &c., much more thoroughly than the liquid can. This process, moreover, requires no mechanical arrangements, such as are necessary for washing the substance in the liquid. Again, wool and hair are much more thoroughly cleaned by this process than by the alkaline treatment commonly in use, which frequently leaves so much oil in the wool that it will not take the desired color, and the dyer is obliged to rewash it. This process is also applicable to the cleaning of cotton waste or other substances from which it is desirable to extract petroleum oil or any of the heavier hydrocarbons, these oils being dissolved by the vapor of the light hydrocarbons, and then separated therefrom by redistillation, as described above.

I claim—

1. The extraction, substantially as herein set forth, of fatty and oily matter by the application of hydrocarbon vapors in a closed vessel.

2. Simultaneously cleansing and extracting oily and fatty matters by the application of hydrocarbon vapors, generated in the same vessel which contains the wool or other material to be operated on.

3. Extracting oily and fatty matters by means of hydrocarbon vapors, which are condensed, revaporized, and reused, substantially in the manner described.

In testimony whereof we have signed our names to this specification in the presence of two subscribing witnesses.

CHS. F. A. SIMONIN.
E. W. COFFIN.

Witnesses:
WM. A. STEEL,
JOHN PARKER.